Patented May 20, 1930

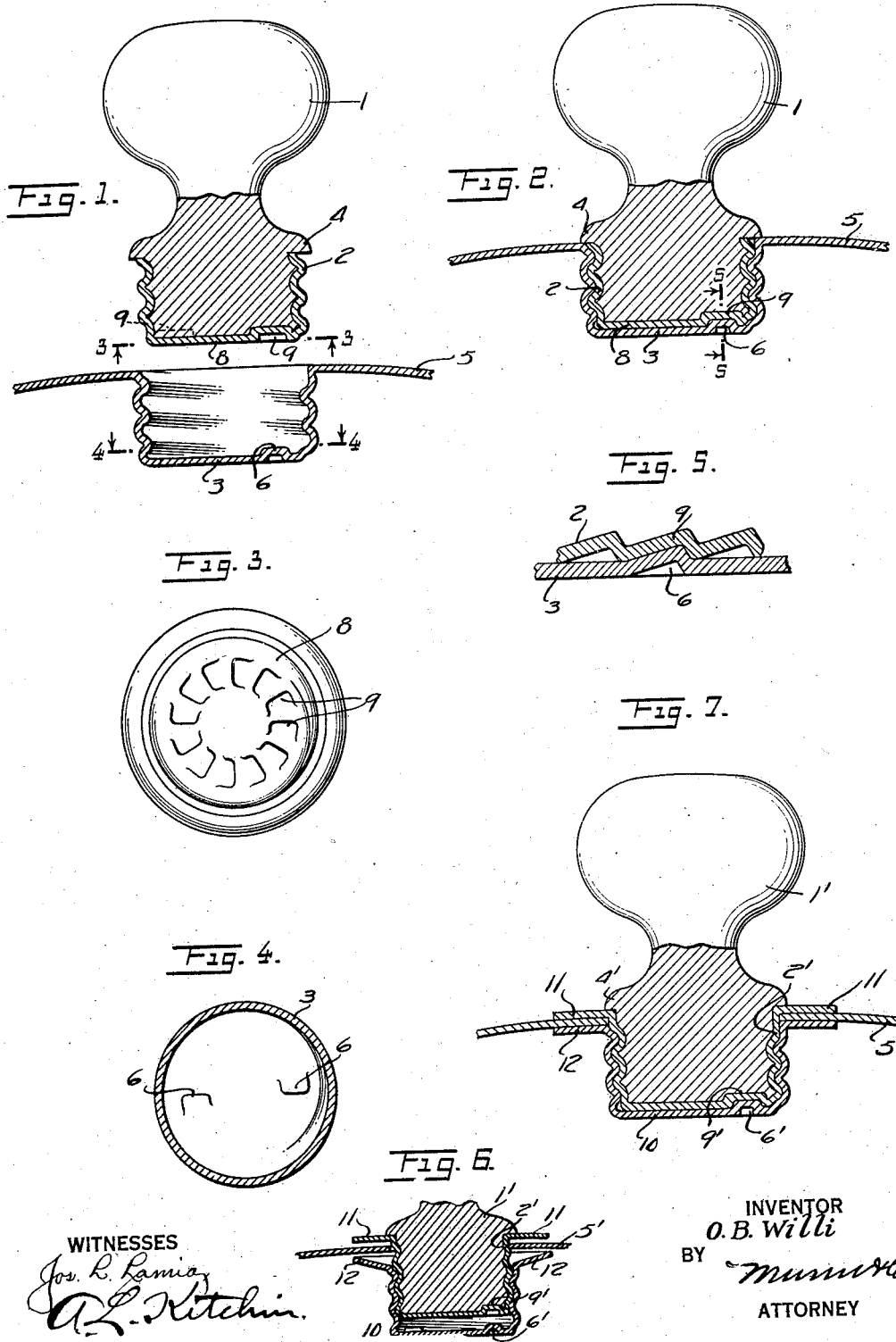

1,759,771

UNITED STATES PATENT OFFICE

OTTO B. WILLI, OF MONTGOMERY CITY, MISSOURI

KNOB-ATTACHING DEVICE

Application filed February 21, 1929. Serial No. 341,745.

This invention relates to knob holding devices, and particularly a holding device for securing knobs to covers for pots, kettles and the like, the object being to provide an improved construction wherein the knob is permanently held in place without any of the holding means coming in contact with the hand when the knob is grasped.

Another object of the invention is to provide a holding device for knobs which may be readily screwed into place and which is automatically locked against accidental removal.

A further object of the invention is to provide an improved connecting device for connecting knobs to covers, the structure being such that part of the device may be made integral with the cover or separate and clamped thereto simultaneously with the securing of the knob in place.

In the accompanying drawings,—

Figure 1 is a longitudinal vertical sectional view through a device embodying the invention, the knob being shown separated from the cover to better illustrate the detail parts;

Figure 2 is a view similar to Figure 1 but showing the parts connected;

Figure 3 is a bottom view of the knob and associated parts as seen from the section line 3—3 of Figure 1;

Figure 4 is a sectional view through Figure 1 on the line 4—4;

Figure 5 is an enlarged detail fragmentary view through Figure 2 on the line 5—5;

Figure 6 is a sectional view similar to Figure 1 but showing the parts partly connected together for illustrating how the socket is formed with an inclined clamping flange;

Figure 7 is a sectional view similar to Figure 2 but showing the attaching device illustrated in Figure 6;

Referring to the accompanying drawings 1 indicates a knob of wood, fibre or other desired material. This knob may be of any desired size and is adapted to be of a size to be readily grasped while part thereof is formed so as to receive a sheathing cup 2. This cup is externally-threaded, or rather, is made of thin material and formed so that the walls will present a thread for fitting in the threaded part of a lower cup or socket 3. By forming the walls of cup 2 as threads it may be screwed onto threads formed into the wood or other material of knob 1, whereby a tight connection is provided between the two members. Preferably the knob 1 is provided with an annular overhanging portion 4 which presses against the lid 5, as shown in Figure 2. When the cup 2 has been screwed into position, as shown clearly in Figure 1, the socket 3 is pressed from the lid or cover 5 and is therefore integral therewith. This structure is preferable where the invention is being applied to a new cover. Where it is applied to an old cover a different form is provided, as shown in Figures 6 and 7, which will be fully described hereinafter. The socket 3 is provided with a number of pressed-up portions 6. As shown in Figure 4, there are two pressed-up portions 6, though one may be used, or more than two. Preferably two are provided, as this number is comparatively easy to make and performs the desired function. The bottom 8 of the cup 2 is provided with a number of pressed-out portions 9 similar to portions 6 but in the opposite direction. In Figure 5 an enlarged view is shown, and this view also illustrates how the pressed-up portions or sections 6 interlock with the pressed-out portions or sections 9. These pressed-out portions are inclined in such a direction that the cup 2 may be readily screwed into its functioning position, as shown in Figure 2. However, these members 6 and 9 resist any reverse movement and thereby lock the parts together. This resistance is appreciable but may be overcome by using some appreciable power in rotating the knob in a reverse direction. This structure therefore provides means for preventing any accidental disconnection of the knob and associated parts from the cover or lid 5, but permits a removal where it is desirable or necessary.

Where it is desired to use the knob attaching device embodying the invention to old covers, this may be done by using the construction shown in Figures 6 and 7. If the old cover does not have a sufficiently large aperture one is formed therein and then a special socket 10 is positioned beneath the aperture so as to receive the cup or jacket 2' secured to the knob 1' similar to the cup or jacket 2. The cup 2' is provided with a radiating flange 11 adapted to press against the outer surface of the lid 5' adjacent the aperture, while the socket 10 is provided with a flange 12 adapted to press part of the inner surface of the cover 5'. When the socket 10 is first made the flange 12 is arranged at an angle as shown in Fig. 6, whereby a proper pinching action will be secured between flanges 11 and 12 as soon as the jacket 2' has been screwed down fully, as shown in Figure 7. The jacket 2' and socket 10 are provided with projections 6' and 9', which projections are identical with those shown in Figures 1 and 5 and will therefore need no additional description. By providing connecting means disclosed in the drawings there are no metal parts which will come in contact with the hands when the knob is grasped in applying or removing the cover. In the case of the modified form shown in Figure 7 the flanges 11 and 12, in addition to functioning as heretofore described, act to stiffen the cover so that when the invention is applied to an old cover, the old cover is really improved by the stiffening action, as well as by the addition of a desirable knob.

What I claim is:—

1. A knob attaching device for kettle covers and the like, comprising a threaded socket carried by the cover, and an externally-threaded cup permanently connected to the knob, said socket and said cup having integral interlocking means for resisting unscrewing of the cup from the socket.

2. The combination of a knob and a cover, of an attaching device for connecting the knob to the cover, said device including an internally-threaded socket carried by said cover, and an externally-threaded member carried by said knob adapted to be screwed into said socket, and means for preventing accidental separation of said socket and said threaded member, said means comprising a notched structure and catch member coacting therewith, said notched structure and catch member being carried respectively by said internally-threaded socket and said externally-threaded member.

3. The combination with a knob and a cover, of a socket associated with the cover, said socket being provided with threads and with a raised portion and a sheathing surrounding part of the knob formed with threads and with depressed portions or notches, said sheathing being adapted to be screwed into said socket, while one of the depressed portions receives said pressed-out portion of said socket so as to lock the parts against accidental unscrewing.

4. In a device for attaching a knob to a cover, a depressed socket formed integral with the cover, and a metal sheathing for part of the knob formed with threaded portions adapted to be screwed into the socket, said socket and said sheathing having interlocking members positioned to interlock when the sheathing has been screwed to the bottom of the socket.

5. In a device of the character described, a cover provided with an integrally depressed portion having threaded sides and a bottom with a plurality of pressed-up catch members, a knob having a base and a sheathing for said base formed with a bottom covering the bottom of the base, said sheathing at the sides being formed with threads so that the sheathing may be screwed into said socket, said base being formed with a plurality of depressed portions for receiving said pressed-up catch members and thereby lock the sheathing to the socket.

6. In a device of the character described, a cover formed with a hole therein, a socket formed with a threaded portion and with a radial flange adapted to fit against the under surface of the cover adjacent said hole, a knob and a sheathing for the knob formed with a threaded portion adapted to be screwed into said socket and also formed with a flange adapted to fit flatwise against the outer surface of said cover adjacent said hole, said flanges acting to clamp the cover when the threaded portion of the sheathing has been screwed tightly into said socket.

7. In a device of the character described, a cover provided with a hole, an independent socket member formed with threaded sides and with a flange at the open end, said flange extending at less than a right angle to the threaded walls, a knob coacting with said socket formed with the threaded portion and a clamping flange adapted to fit against the outside of said cover, said threaded portion when screwed tightly into said socket acting to draw the socket towards the cover and cause the flange on the socket to firmly grip the cover adjacent said hole.

8. In a device of the character described, a cover provided with an aperture, an independent socket formed with a threaded wall having a flange at the open end and a bottom having a catch projection, a knob and a sheathing for the base of the knob, said sheathing having a flange adapted to coact with the flange of the socket for gripping said cover while said sheathing is adapted to interlock with the socket, said sheathing at the bottom having notches for accommodating said catch projection for locking the knob to the socket.

OTTO B. WILLI.